United States Patent
Fan et al.

(10) Patent No.: US 8,904,292 B2
(45) Date of Patent: Dec. 2, 2014

(54) METHOD AND SYSTEM FOR PROCESSING ELECTRONIC MAIL

(75) Inventors: Zhi-Hua Fan, Beijing (CN); Mark T Ahlenius, Lombard, IL (US); Craig J Detter, Gurnee, IL (US); James C Ferrans, Wheaton, IL (US); Kun Zhao, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 419 days.

(21) Appl. No.: 12/633,319

(22) Filed: Dec. 8, 2009

(65) Prior Publication Data

US 2010/0262922 A1 Oct. 14, 2010

Related U.S. Application Data

(60) Provisional application No. 61/141,976, filed on Dec. 31, 2008.

(51) Int. Cl.
*G06F 3/00* (2006.01)
*G06Q 10/10* (2012.01)

(52) U.S. Cl.
CPC .................................. *G06Q 10/107* (2013.01)
USPC ....................................................... 715/752

(58) Field of Classification Search
CPC .... G06Q 10/107; G06Q 10/10; H04L 12/581; H04L 12/5855; H04L 12/587; H04L 51/04; H04L 12/586; G06F 17/30011; G06F 3/0481
USPC ....................................................... 715/752
See application file for complete search history.

(56) References Cited

U.S. PATENT DOCUMENTS

| | | | | |
|---|---|---|---|---|
| 5,835,084 | A * | 11/1998 | Bailey et al. | 715/783 |
| 6,640,301 | B1 * | 10/2003 | Ng | 713/156 |
| 6,694,459 | B1 * | 2/2004 | Nyman | 714/718 |
| 6,704,722 | B2 | 3/2004 | Wang Baldonado | |
| 7,089,287 | B2 | 8/2006 | Bellotti et al. | |
| 7,139,800 | B2 | 11/2006 | Bellotti et al. | |

(Continued)

FOREIGN PATENT DOCUMENTS

JP 2000322344 A 11/2000

OTHER PUBLICATIONS

Virtual Town; Virtual Town Hall; © 2008; 17 pages.*

(Continued)

*Primary Examiner* — Linh K Pham
(74) *Attorney, Agent, or Firm* — Morgan, Lewis & Bockius LLP

(57) ABSTRACT

A method and system for processing email messages are disclosed. In at least one embodiment, the method includes receiving a first signal input indicative of a request that contents of a selected email message be displayed on a display associated with a client computer device, wherein the contents are stored in a memory device associated with a server computer device and include contents of at least one other email message. The method further includes causing displaying of the contents of the selected email message for reviewing by the user. The method additionally includes making a determination of whether the contents of the at least one other email message have been reviewed by the user during the user's review of the contents of the selected email message, and providing an indication regarding whether or to what extent the at least one other email message has been read based upon the determination.

9 Claims, 5 Drawing Sheets

(56) References Cited

U.S. PATENT DOCUMENTS

| | | | |
|---|---|---|---|
| 7,359,947 B2 | 4/2008 | Kelley et al. | |
| 7,506,263 B1* | 3/2009 | Johnston et al. | 715/752 |
| 7,657,598 B2* | 2/2010 | Daniell et al. | 709/206 |
| 2002/0002588 A1* | 1/2002 | Sugimoto | 709/206 |
| 2003/0135558 A1 | 7/2003 | Bellotti et al. | |
| 2003/0135559 A1 | 7/2003 | Bellotti et al. | |
| 2003/0135659 A1 | 7/2003 | Bellotti et al. | |
| 2005/0004989 A1* | 1/2005 | Satterfield et al. | 709/206 |
| 2005/0004990 A1* | 1/2005 | Durazo et al. | 709/206 |
| 2005/0223057 A1 | 10/2005 | Buchheit et al. | |
| 2005/0223067 A1* | 10/2005 | Buchheit et al. | 709/206 |
| 2005/0234850 A1* | 10/2005 | Buchheit et al. | 707/1 |
| 2005/0234910 A1* | 10/2005 | Buchheit et al. | 707/9 |
| 2006/0143280 A1* | 6/2006 | Ohba | 709/206 |
| 2006/0161849 A1* | 7/2006 | Miller et al. | 715/744 |
| 2007/0106729 A1 | 5/2007 | Adams et al. | |
| 2007/0282956 A1* | 12/2007 | Staats | 709/206 |
| 2008/0098066 A1 | 4/2008 | Mausolf et al. | |
| 2009/0119678 A1* | 5/2009 | Shih et al. | 719/313 |
| 2009/0228807 A1* | 9/2009 | Lemay | 715/752 |
| 2009/0287779 A1* | 11/2009 | Haynes et al. | 709/206 |
| 2009/0300127 A1* | 12/2009 | Du | 709/206 |
| 2009/0313554 A1* | 12/2009 | Haynes et al. | 715/752 |
| 2009/0327972 A1* | 12/2009 | McCann et al. | 715/853 |
| 2010/0125636 A1* | 5/2010 | Kuhlke et al. | 709/206 |
| 2012/0191848 A1* | 7/2012 | Norair | 709/224 |
| 2012/0260351 A1* | 10/2012 | Majeti et al. | 726/28 |
| 2013/0340094 A1* | 12/2013 | Majeti et al. | 726/28 |

OTHER PUBLICATIONS

Kerr; Thread ARCS: An Email Thread Visualization; IEEE; © 2003; 34 pages.*

Victoria Bellotti, et al, "Taking Email to Task: The Design and Evaluation of a Task Management Centered Email Too", Apr. 5-10, 2003, pp. 345-352, vol. No. 5, Issue No. 1, Fort Lauderdale, Florida USA.

Li-Te Cheng, et al, "A Mobile User Interface for Threading Marking and Previewing Email" pp. 1-8, Cambridge, MA, USA.

PCT Notification of Transmittal of the International Search Report and the Written Opinion of the International Searching Authority, or the Declaration, Jul. 14, 2010, pp. 1-9, PCT/US2009/067389, Korean Intellectual Property Office.

European Patent Office, "Extended European Search Report" for Patent Application No. 09836775.8 Dec. 20, 2013, 9 pages.

The State Intellectual Property Office of the People's Republic of China, "Notification of the Third Office Action" for Patent Application No. 200980153502.5 Dec. 18, 2013, 21 pages.

\* cited by examiner

FIG. 3A

| INBOX | | | |
|---|---|---|---|
| ! ☐ ⌘ FROM | SUBJECT | RECEIVED ▽ | SIZE |
| ☒ MAX JONES | RE: HELLO THERE! - RESPONSE 1 | THU 12/11/08 11:35 AM | 8KB |
| ☒ SIMON MCDONALD | RE: RE: HELLO THERE! - RESPONSE 2 | THU 12/11/08 11:29 AM | 5KB |
| ☒ MARY JANE | RE: HELLO THERE! - RESPONSE 1 | THU 12/11/08 11:25 AM | 4KB |
| ☒ JOE SMITH | HELLO THERE! | THU 12/11/08 11:21 AM | 3KB |

FIG. 3B

| INBOX | | | |
|---|---|---|---|
| ! ☐ ⌘ FROM | SUBJECT | RECEIVED ▽ | SIZE |
| ☒ MAX JONES | RE: HELLO THERE! - RESPONSE 1 | THU 12/11/08 11:35 AM | 8KB |
| ↩ SIMON MCDONALD | RE: RE: HELLO THERE! - RESPONSE 2 | THU 12/11/08 11:29 AM | 5KB |
| ☒ MARY JANE | RE: HELLO THERE! - RESPONSE 1 | THU 12/11/08 11:25 AM | 4KB |
| ☒ JOE SMITH | HELLO THERE! | THU 12/11/08 11:21 AM | 3KB |

FIG. 3C

| INBOX | | | |
|---|---|---|---|
| ! ☐ ⌘ FROM | SUBJECT | RECEIVED ▽ | SIZE |
| ☒ MAX JONES | RE: HELLO THERE! - RESPONSE 1 | THU 12/11/08 11:35 AM | 8KB |
| ↩ SIMON MCDONALD | RE: RE: HELLO THERE! - RESPONSE 2 | THU 12/11/08 11:29 AM | 5KB |
| ↩ MARY JANE | RE: HELLO THERE! - RESPONSE 1 | THU 12/11/08 11:25 AM | 4KB |
| ↩ JOE SMITH | HELLO THERE! | THU 12/11/08 11:21 AM | 3KB |

METHOD AND SYSTEM FOR PROCESSING ELECTRONIC MAIL

FIELD OF THE INVENTION

The present invention relates to digital communication systems and, more particularly, to digital communication systems involving electronic mail (email).

BACKGROUND OF THE INVENTION

Electronic mail or email, which typically involves a text message that is sent via an electronic network such as the Internet from a sender to one or more recipients, is ubiquitously used all over the world for a wide variety of applications ranging from personal to industrial applications and the like. Email is typically implemented using a variety of email clients such as Outlook™, Outlook Express, etc.

Often, emails are involved in establishing email conversations or email threads in which succeeding emails usually contain copies of any related preceding emails. A given user may have, as a result of such email conversations/threads, a series of email messages that are related to one another in a listing of the user's email messages (e.g., as stored in an "inbox"), where one of the listed email messages contains the contents of one or more of the other listed email messages.

Given the large number of email messages that can collect in a user's inbox, and given the large number of related email messages that can be contained in a given email conversation/thread, a user can find difficulty keeping-up with and reading all of his or her email messages. Where the user's inbox in particular includes numerous email messages and the contents of those email messages are contained in subsequent email messages of the user, it can be especially inefficient for a user to review all of the related email messages, since this often will involve repeatedly reviewing the same contents in multiple email messages.

For at least these reasons, therefore, it would be advantageous if an improved email system and/or method were developed and, more particularly, if an improved email system and/or method that allowed for more efficient review of related email messages by a user could be developed.

SUMMARY OF THE INVENTION

In at least some embodiments, the present invention relates to a method of processing email messages. The method includes receiving a first signal input by a user via a client computer device indicative of a request that contents of a selected email message be displayed on a display associated with the client computer device, wherein the contents of the selected email message are stored in a memory device associated with a server computer device and include contents of at least one other email message. The method further includes causing displaying on the display of at least some of the contents of the selected email message for reviewing by the user. The method additionally includes making a determination, at either the client computer device or the server computer device, of whether the contents of the at least one other email message have been reviewed by the user during a review by the user of the displayed contents of the selected email message. The method also includes providing an indication regarding whether or to what extent the at least one other email message has been read based upon the determination.

Further, in at least some embodiments, the present invention relates to a method for processing email messages. The method includes (a) receiving at a client computer device an indication from a user to display contents of a selected email message stored in a server device, wherein the contents of the selected email message include a first portion and a second portion corresponding to contents of first and second previous email messages also stored in the server device, respectively. The method also includes (b) displaying at the client computer device the contents of the selected email message for reading, and (c) determining whether the first portion of the selected email message has been sufficiently considered by the user during the displaying of the contents of the selected email message. The method further includes (d) providing an indication at the client computer device as to whether the first previous email message has been read based upon the determining, and (e) repeating (c)-(d) in relation to the second portion and the second previous email message.

Additionally, in at least some embodiments, the present invention relates to a system for processing emails. The system includes a server computer device having a processing device and a memory including at least one database for storing a plurality of email messages associated with an inbox accessible by a client computer device operated by a user. The server computer device is capable of receiving information from a client computer device that is indicative of an extent to which a user operating the client computer device has reviewed contents of a first email message included among the plurality of email messages. Also, the server computer device is configured to determine, based upon the received information, whether the user has reviewed contents of another email message among the plurality of email messages while reviewing the contents of the first email message. Further, upon making a determination that the user has reviewed the contents of the other email message while reviewing the contents of the first email message, the server computer device modifies a read status of the other email message as stored in the memory and further provides a signal for receipt by the client computer device causing the client computer device to provide an indication of the modified read status.

BRIEF DESCRIPTION OF THE DRAWINGS

FIGS. 3A-3C are exemplary schematic screenshots capable of being displayed by an email client such as the email clients of FIG. 1 showing the statuses of multiple email messages (in terms of whether the messages have been read)

DETAILED DESCRIPTION OF THE INVENTION

Figure 1:
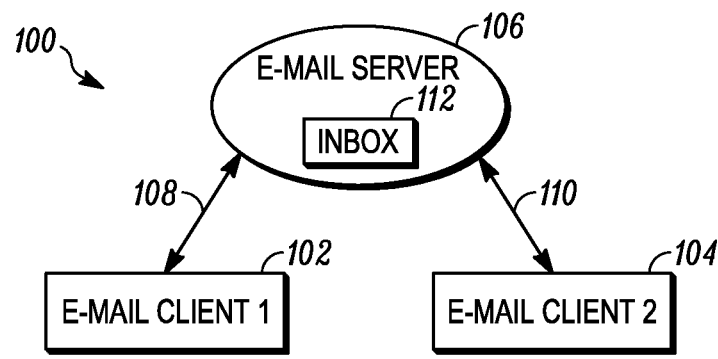
FIG. 1 shows in schematic form an exemplary electronic messaging system employing a plurality (in this example, two) of electronic mail (email) clients in communication with one another by way of an email server, in accordance with at least some embodiments of the present invention.

Referring to FIG. 1, an electronic messaging system 100 having a first electronic mail (email) client 102 in communication with a second email client 104 is shown, in accordance with at least some embodiments of the present invention. As shown, the first and second email clients 102 and 104, respectively, are in communication with one another via an email server 106 through respective communication links 108 and 110. The system 100 can also be considered a digital communications system.

Each of the email clients 102 and 104 in particular is a front-end software program capable of being implemented on any of a wide variety of hardware devices including, for example, personal computer systems, mobile (or wireless) communication devices, wireless telephones, personal digital assistants (PDA), and the like, for facilitating exchange and handling of email messages (also referred hereinafter as simply email) via the email server 106. In at least some embodiments, each of the email clients 102 and 104 is a mail user agent (MUA) or an email reader that serves to manage email traffic. Examples of the email clients 102 and 104 can include stand-alone software programs, such as Microsoft Outlook™, Outlook Express, Eudora® and Pegasus mail, or web-based email programs, such as Google Mail, Yahoo mail, Hotmail and the like. Various other types of email clients other than those mentioned above can be employed as well for implementing the first and second email clients 102 and 104, respectively.

The email server 106, which facilitates communication between the first and second email clients 102 and 104, respectively, can be any of a variety of computer server systems having a central processing unit (CPU), a memory system, as well as several other components commonly associated therewith. In other embodiments, the email server 106 can be representative of one or more other types of computer systems including other hardware devices and/or machines. Further, the email server 106 is capable of implementing one or more email based software programs or protocols, such as the Simple Mail Transfer Protocol (SMTP) for managing outgoing mail, as well as Post Office Protocol (POP) or Internet Mail Access Protocol (IMAP) for handling incoming emails. Other protocols capable of facilitating email exchanges and handling email communication between the first and second email clients 102 and 104, respectively, can be employed as part of, or in conjunction or combination with, one or more of the SMTP, POP and IMAP protocols.

The email server 106 is capable of storing email messages of the first and second email clients 102 and 104, respectively, in a listing form within a database, often referred to as an inbox 112. In the present embodiment, the email server 106 can store email messages within memory (or separate databases) allocated to each of the respective first and second email clients (e.g., for listing and/or displaying within respective inboxes of those respective clients) 102 and 104—that is, the inbox 112 of the email server should be understood more particularly as including first and second inboxes in which are stored the respective email messages associated with the respective clients 102 and 104.

By accessing the email server 106, the respective first and second email clients 102 and 104 are able to access and display (or otherwise output) the email messages associated with those respective clients. That is, the respective first and second email clients 102, 104 are able to access and display the respective email messages in their respective inboxes 112. Also, user(s) interacting with each of the email clients 102, 104 are able to create email messages and then send those created email messages to the inboxes of other email clients. Thus, a user operating the first email client 102 is able to cause an email message to be sent to the inbox associated with the second email client 104, and vice-versa. The email messages that are received and/or created/sent typically include text, but also can include other graphical information or attachments containing data having a variety of formats.

Further, as indicated above, interaction between the first and second email clients 102 and 104, respectively, and the email server 106, occurs by way of the respective communication links 108 and 110. Each of the communication links 108 and 110 can be any of a wide variety of network interfaces including both wired (e.g., landline) and wireless network interfaces, as well as links involving the internet or the World Wide Web. Various local area networks (LAN), intranet-type networks and other types of network interfaces are additionally contemplated and considered within the scope of the present invention. In other embodiments, communication links other than those mentioned above and suitable for facilitating email communication can be employed as well.

Notwithstanding the fact that in the present embodiment the inboxes 112 are located within the email server 106, it will be understood that in other embodiments, the inboxes can be located within each of the email clients 102 and 104, such that the email messages associated with those respective clients are stored at those clients (or in memory devices directly associated with those clients). In such embodiments, the email messages are not only displayed/output and created/input at the clients, but also are stored with the clients. Additionally, notwithstanding the fact that in the present embodiment only two email clients 102 and 104 have been shown, it will be understood that this need not be the case in other embodiments. Rather, in other embodiments, more than two email clients in communication with one another through the email server 106 can be employed. Further, each of the email clients 102 and 104 can be implemented either on a single hardware machine or alternatively, as shown, on multiple machines in communication with one another via one or more networks and/or network protocols.

Further, while only the single email server 106 is shown for simplicity, it is often the case that multiple machines operating as email servers are present. In some such embodiments, such a given server will serve to store the inbox(es) associated with only one or more particular clients (e.g., the first email client 102) while different server(s) will serve to store the inbox(es) associated with other client(s). Also, different servers can be respectively dedicated for operations in accordance with different respective protocols. Often multiple email clients are connected directly and/or indirectly to and/or by way of multiple email servers. For example, the email client 102 can be connected to a first email server at which is stored the email messages in an inbox with which that email client is associated, while the email client 104 is connected to a second email server at which is stored the email messages in an inbox with which that email client is associated. The first and second email servers can then be in communication with one another when messages are sent (e.g., a message from the email client 102 destined for the email client 104 can pass to the inbox of the email server associated with the email client 104, and vice-versa). In still further embodiments, such first and second email servers can be in communication indirectly via still additional email (or other) servers or other machines or entities.

Figure 2A:
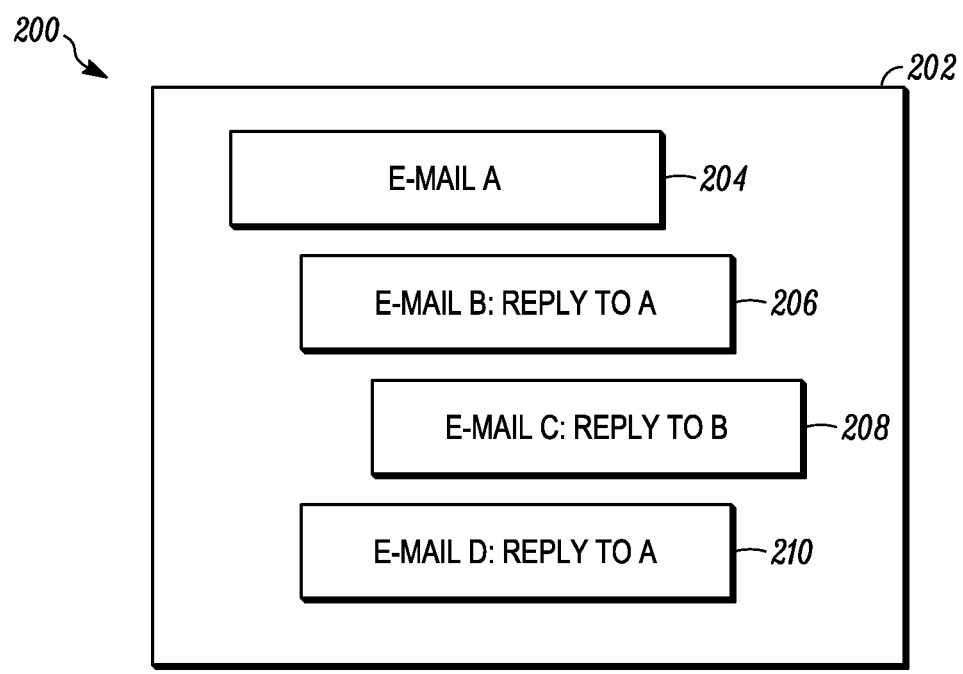
FIG. 2A schematically shows an exemplary group of email messages created as a result of communications among the plurality of email clients of FIG. 1.

Turning now to FIGS. 2A-2E, an exemplary listing of a plurality of emails 200 stored within a given inbox associated with a given client (e.g., the email messages stored within an inbox associated with the first client 102 of FIG. 1) is shown in a simplified, schematic form, in accordance with at least some embodiments of the present invention. More particularly, FIG. 2A shows in schematic form how the listing of the plurality of emails 200 stored in the inbox is displayed in a view window 202 of a display mechanism of the email client that is accessing that inbox, while FIGS. 2B-2E provide an example of the content that is displayed upon opening one of the plurality of emails of the listing 200 of FIG. 2A.

With respect to FIG. 2A, the listing of the plurality of emails 200 as shown in the view window 202 includes a first email (Email A) 204 and several succeeding emails in response to the first email, namely, a second email (Email B) 206, a third email (Email C) 208, and a fourth email (Email D) 210. Although not shown in FIG. 2A, it will be understood that each of the first, second, third, and the fourth emails 204, 206, 208 and 210, respectively, has associated with it a respective message body containing the contents of that respective email, as well as one or more portions of information including, sender's name, subject line, date and time and size of the email. Various other types of information, such as, sorting information, attachment information etc. can potentially be associated and provided along with the emails 204-210 as well.

In the present example, the second email 206 is in response to the first email 204, and the third email 208 is in response to the second email. By virtue of the second email 206 being a reply email to the first email 204, the second email is related to the first email by way of at least the sender and receiver(s) of those emails, and the contents of the second email include contents of the first email (as will typically be the case). Similarly, the third email 208, which is a reply to the second email 206, is related to the second email in a manner similar to that in which the second email is related to the first email 204, and also is thus indirectly related to the first email 204 through the second email 206 (since the second email is related to the first email). The third email 208 in particular includes contents of both the first and the second emails 204 and 206, respectively, in addition to its own contents.

Similar to the second email 206, which is related to the first email 204, the fourth email 210 is a reply to the first email and is thus related to that first email (e.g., by sender, receivers(s) and/or shared content). Accordingly, each of the emails 206 and 208 shares contents with one or more of the other emails (e.g., the first email 204), as well as are co-related with one another and with other emails (e.g., the first email 204) in one or more aspects including, for example, sender, receiver, date, time, subject, etc. Further, the email 210 shares contents with the email 204. For these reasons, the emails 204, 206, 208 constitute an exemplary email thread (or simply thread), as do the sets of emails 204 and 206, 206 and 208 and 204 and 210.

Figure 2B:
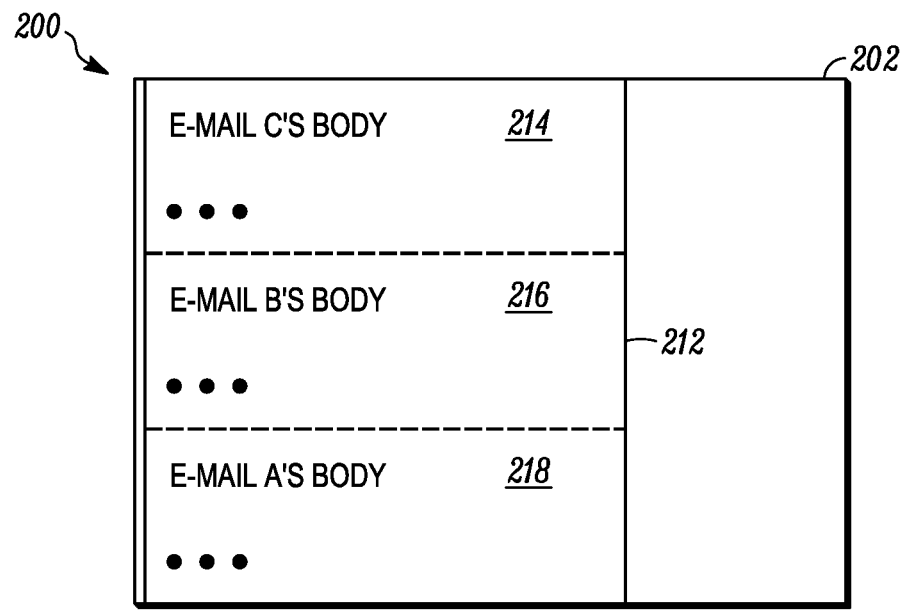
FIGS. 2B-2E show exemplary message contents of one email message of the group of email messages of FIG. 2A.

Referring now to FIGS. 2B-2E in conjunction with FIG. 2A, FIG. 2B shows a message body 212 displaying the contents of the third email 208 within the view window 202, in accordance with at least some embodiments of the present invention. In the present embodiment, in order to serve as a conversation context, every subsequent email within a given email thread includes, as part of its content, the content found within the preceding emails of the thread to which that subsequent email is related. Thus, in the present example shown in FIG. 2B, the message body 212 of the third email 208 contains not only new message content 214 that has only been originally provided as part of the third email, but also includes copies of the content found within the second and the first emails 206 and 204, as illustrated by respective second and first thread portions 216 and 218, respectively.

Although the message body 212 including the message content 214 of the third email 208 as well as the second and first thread portions 216 and 218, respectively, are shown in FIG. 2B as fitting within the size of the view window 202, this need not always be the case. Rather, as will be described further below with respect to FIGS. 2C-2E, commonly the message body 212 is sufficiently lengthy that all of the message content cannot be simultaneously displayed in the view window 202. In such cases, various procedures can be followed by a user to allow for the display of various/successive portions of the content of the email. For example, a scroll operation can performed by a user actuating a scroll bar 219 provided on the view window 202 as shown in FIGS. 2C-2E, which allows the view window to display different portions of the content of a given email and thus allows a user to view all of the contents of the email as desired or required.

As discussed above, in conventional email systems the existence of email threads often results in inboxes having one or more email threads including multiple emails that share content with one another. As the number of replies or subsequent messages in a given email thread increases, a user can find it increasingly difficult to manage reviewing all of the related emails, and in particular the repeated review of the same content found in numerous email messages of the same thread can become tedious and time consuming. In contrast to such conventional email systems, at least some embodiments of the present invention overcome or alleviate such concerns by affording a mechanism that allows a user to benefit more fully from the user's review of the content of a given email.

More particularly, at least some embodiments of the present invention determine whether content within a given email being reviewed by a user is found in other email(s) within the same thread as that given email. When such a determination is made, action is then further taken by the system to provide an indication to the user that the content of the preceding email(s) has in fact been reviewed by the user, such that the user need not select and open those preceding email(s). Typically (although not necessarily) such an indication is provided by marking those preceding email(s) as having been read in the listing of emails (such as the listing 200 of FIG. 2A) in the inbox. Thus, by operating in this manner, a user need not invest additional time independently reviewing preceding email(s) when the user has already considered the content of those preceding emails during review of a subsequent email of the same email thread.

Figure 2C:
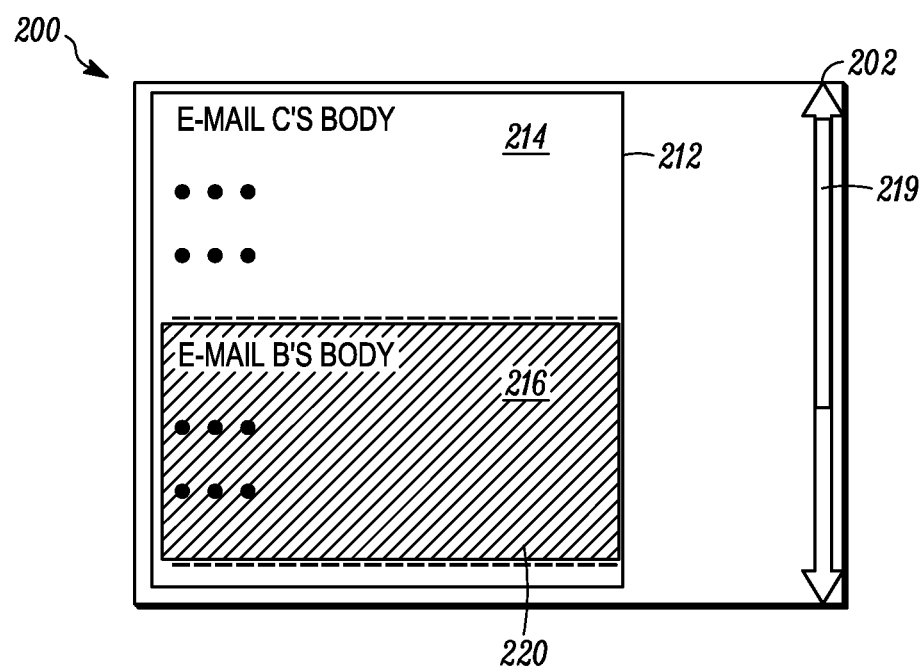
Figure 2D:
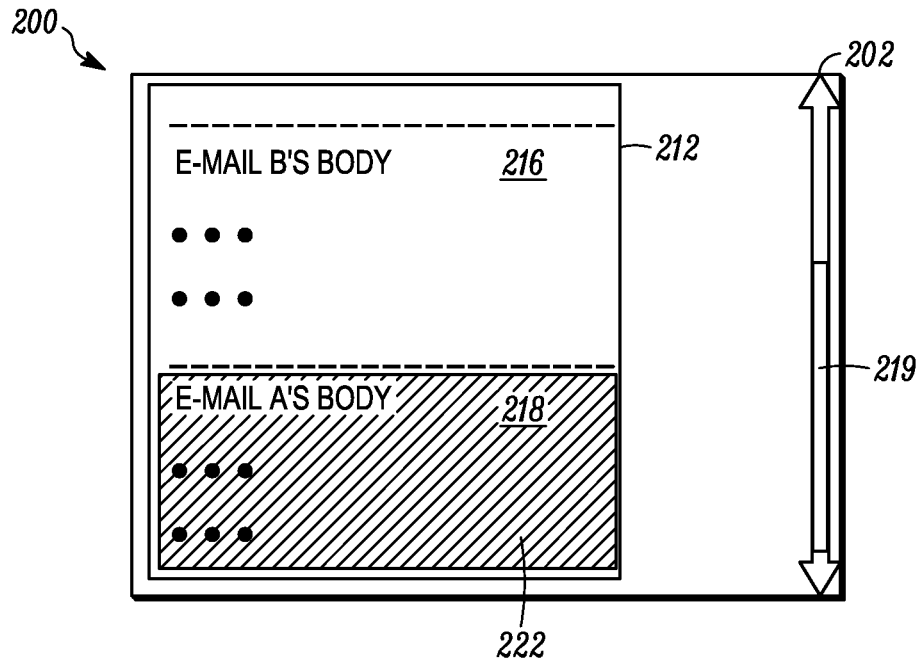
Figure 2E:
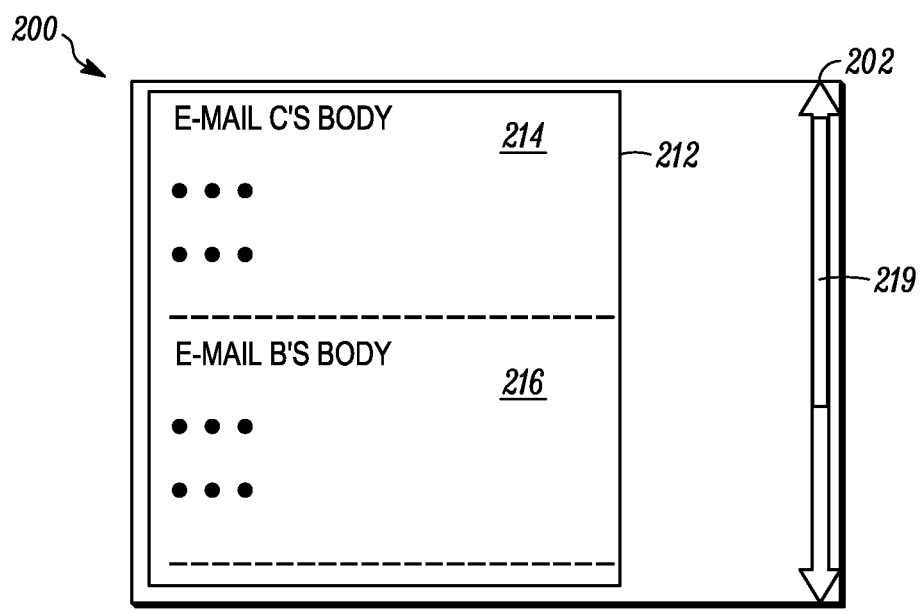

Referring to FIGS. 2C-2E, three additional views of the view window 202 are provided illustrating in more detail one exemplary manner of interaction experienced by a user when interacting with a client (e.g., the first client 102) so as to read the third email 208 of the listing 200 of FIG. 2A (which as noted above is the third email in a thread of emails also including the first and second emails 204, 206). In this exemplary embodiment, different portions of the content of the third email 208 are viewed through the use of the scroll feature mentioned above. More particularly, as shown in FIG. 2C, upon selection of the third email 208 from the listing 200 (of FIG. 2A), the user can cause to be displayed within the view window 202 the message content 214 provided originally as part of the third email 208 and the second thread portion 216 including the contents of the second email 206. Further, by appropriate actuation of the scrolling bar 219, the user can additionally cause to be displayed within the view window 202 the second and first thread portions 216, 214 including the contents of the second and first emails 206, 204.

As the various contents of the third email 208 are displayed on the view window 202, due to scrolling operation or otherwise, the system 100 (more particularly, the server 106 operating in conjunction with an appropriate client such as the first client 102) operates to recognize that a given portion of the content of an email has been read/reviewed by a user. Such recognition can be achieved by the system 100 in a variety of manners depending upon the embodiment. In at least some embodiments, the user upon (or while) reviewing a portion of the content of an email provides an indication or input that signifies or confirms that the user has reviewed that portion of the content. In at least some other embodiments, the system 100 (e.g. the email server 106 or an appropriate one of the clients) automatically makes a determination that a given portion of the content has been read. Whether recognition is in response to user inputs or is automatic can, in at least some embodiments, be set by the user.

As noted, once the system 100 recognizes that the content associated with a given email has been read by a user during the user's review of another email, the system 100 then further modifies the read status of the given email in the associated inbox. Further, when displaying (or redisplaying) the listing 200 of the emails in that inbox, the system 100 further modifies the manner in which the given email is displayed in the listing. For example, assuming that the system 100 has recognized that the second thread portion 216 has been read by a user as illustrated in FIG. 2C, the system 100 then modifies the read status of the second email 206 within the inbox associated with the client being operated by the user. This can be indicated, for example, by highlighting/cross-hatching the box corresponding to the second email 206 in FIG. 2A, as shown by a reference numeral 220 in FIG. 2C. Similarly, assuming that the system 100 has recognized that the first thread portion 218 has been read, the system modifies the read status of the first email 204 and, when displaying the listing 200, provides an indication that the first email has been read (again, the corresponding box can be highlighted/cross-hatched as shown by a reference numeral 222).

Also as further illustrated by FIG. 2E, once the system 100 has recognized that a given thread portion has been read and in turn modified the read status of the email corresponding to that thread portion, then the highlighting associated with the thread portion in the email being read can be removed. FIG. 2E in particular illustrates the removal of highlighting once the system 100 has determined that the content of the second email 206 has been read and modified the read status of that second email accordingly. Although not necessarily the case, the removal of such highlighting would typically occur only after the user had finished reviewing the overall email (and closed the email), since earlier removal of the highlighting (while the email was still open and being reviewed) might cause confusion to the user in terms of which portions of the email content had been read and which had not yet been read.

Regardless of whether the system 100 operates in a manually-driven or automatic manner in recognizing whether content has been read, in at least some embodiments the view window 202 also is configured to provide visual cues indicating whether a particular portion of content (e.g., a particular portion of content corresponding to a preceding email in the email thread) has been read by the user or presumed to have been read. In some such embodiments, visual cues highlight the portions of content that have been read. For example, referring again to FIG. 2C, when the system 100 recognizes that the contents of the second thread portion 216 have been read by a user, the system highlights (in this example, by way of cross-hatching as shown by the reference numeral 220) the portion of the message body 212 corresponding to those contents. Further for example, referring again to FIG. 2D, when the system 100 recognizes that the contents of the first thread portion 218 have been read by a user, the system highlights (again, cross-hatches as shown by the reference numeral 222) the portion of the message body corresponding to those contents.

In embodiments where the system 100 operates to recognize that content has been read based upon manually-provided inputs, various particular manual inputs can be utilized depending upon the embodiment. For example, with respect to FIGS. 2C-2D, the recognition by the system 100 that the second and first thread portions 216 and 214 have been read can occur only when the user provides a manual indication by way of moving a cursor over that content using a mouse and "clicking" on that content. That is, the user is able to select all of the content associated with a given email message (e.g., all of the content of the second thread portion 216) as having been read, by selecting a region containing that content (e.g., by clicking on a "box" around that content).

Notwithstanding the above-described manner of selection corresponding to FIGS. 2C-2D, the manner of user input and visual cues employed to represent/confirm such user input can be more specifically tailored to allow determinations of whether particular subportions of the content of a given email message (e.g., part of the content of the second thread portion) has been read. Although it is envisioned that typically such determinations that the content of a given email message has been partially read will be made based upon manual inputs, it is still possible that such determinations of partial reading will be automatically made as well.

As noted above, in at least some alternate embodiments, the system 100 automatically determines whether content associated with a given email (e.g., the second and first thread portions 216, 214) has been read by the user in an automatic manner. For example, the system 100 can determine whether the content has been displayed on the view window 202 for a sufficiently long period of time (e.g., either in a continuous manner, or at least for a sufficiently long period of time in total notwithstanding non-continuous display). The criteria based upon which the system 100 determines that content has been displayed sufficiently long enough can vary depending upon the embodiment. For example, in some embodiments, the adequate exposure time can be a simple pre-defined value programmed into the email client (e.g., the email clients 102 and 104). In other embodiments, the adequate exposure time can be a user-defined value, or can possibly be a dynamic evaluation (e.g., a linear function) of the length of email contents, in terms of byte, words, or syllables.

In still additional embodiments, the system 100 can be configured to evaluate manual inputs and/or to operate automatically in a manner that attempts to determine or take into account the depth or care with which content has been reviewed by a user. For example, in some embodiments, a user's speed of reading various thread portions (including the rapidity with which scrolling takes place) also can be taken into the evaluation for setting the adequate exposure time before updating the reading status of emails within the view window 202. Other configurations and settings for the adequate exposure time can additionally be employed in alternate embodiments.

Further, although highlighting is shown to be employed in FIGS. 2C-2D as a visual cue in the present embodiment, it will be understood that in other embodiments other visual cues (e.g., colorization, highlighting, italicizing, boldfacing, etc., as well as a combination of one or more of the above) can be employed. In some embodiments, these indications can include one or more of progress bars, percentage read/unread numbers, and color cues, although other indications can be utilized as well. It will additionally be noted that, in embodiments where determinations are made that only a portion of the content associated with a given email has been read/reviewed, typically the system will avoid marking the given email within the inbox as having been read. At the same time, in some such embodiments, when the listing (e.g., the listing 200) of emails in the inbox is displayed, other visual cues can be provided in that listing with respect to particular emails having content that has only been partially read by the user (e.g., a "partially read" indicator can be displayed next to those emails in the listing of emails).

Although not usually the case, it is still often the case that a subsequent email in an email thread will include content from a previous email that is close to being, but not exactly, identical to the content of that previous email. Such differences between a given email and the content of a subsequent email based upon that given email can occur for a variety of reasons. For example, a user forwarding an email message received from another user can occasionally wish to partly delete and/or modify (or make minor additions to) the content of the email message being forwarded in view of the needs or qualifications of the intended recipient. Also for example, in at least some embodiments, comments can be embedded into the contents of the thread portions causing those thread portions to differ from the content of the emails in which those thread portions were first introduced.

In the present embodiment, to avoid any mischaracterizations when updating the read status of the emails stored within the inbox (as shown in the listing 200), the system 100 carefully compares the contents of a given email that is actually being read by a user with the corresponding contents of another email upon which the contents of the given email are based. If the contents of a thread portion in the given email are even slightly different from the corresponding contents of the original (or other) email in which those contents were introduced (or otherwise shown), that original email is not marked as having been read even though a user has reviewed the contents of the thread portion of the given email, and even though the contents of the given email and the corresponding contents of the original email are very nearly the same.

In order to determine whether the thread portion of the given email actually mirrors the contents of the original email, in the present embodiment the server 106 leverages a local database associated with the email client (e.g., the email clients 102 and 104), which can track whether particular message content (e.g., the thread portion) has been read or not and whether any changes between various messages have been made. In at least some such embodiments, a cyclical redundancy check (CRC) is utilized as a checksum to detect any alteration between a thread portion of a given email of an email thread and another email in which the thread portion was originally introduced (or otherwise is shown). If any alterations whatsoever (e.g., even a change in one character) are detected, then the read status of the other email in which the thread portion was originally introduced will not be updated to show that the email was read, even though the user reviewed the contents of the given email.

More particularly, use of a CRC type numeric check value is achieved by inserting the check value into the content of the email itself (e.g., at the end of a thread portion) when that content is first created or introduced, with the check value being representative of the content from the start of a thread portion to the end of the thread portion. Then, when the thread portion appears in a subsequent email being read by a user, the system 100 processes the text of the thread portion again to recalculate the CRC value. If the recalculated CRC value differs from the originally-determined CRC value (that is embedded in the thread portion), this signifies to the system that portions of the thread portion have been changed relative to when the content of that thread portion was originally introduced. In such case, the system 100 refrains from marking the original email as being read, notwithstanding the user's review of the subsequent email containing content that is possibly quite similar to the content of the original email.

In email threads containing more than two emails, it is possible for content originating in a first email to be resent in multiple subsequent emails. In such circumstances, it is possible that even though the original content found in the original email is changed in subsequent emails, the changed content found in one subsequent email will appear unchanged in a further subsequent email. In such circumstances, it can still be desirable for the system 100 to mark one of the intermediate emails as being read when the content of that email has been fully considered by a user in a later email, even though it is not appropriate to mark the original email as being read since the content of that email was changed in subsequent emails. The use of CRC values is consistent with achieving such operation, since new CRC values can be generated with respect to the content of each new subsequent email in an email thread (such new CRC values will be embedded in the content of the thread in addition to the CRC values that are already present from earlier emails of the thread) that can then be used as independent bases for comparing the content of a later email in an email thread with the content of each earlier email of the thread.

Notwithstanding the above discussion, it is also understood that in some circumstances certain portion(s) of the content of a given email need not be reviewed by a user in order for it to be appropriate for the email to be considered to have been read. Such content can include, for example, boiler plate disclaimer language at the end of an email (e.g., a confidentiality notice), which is often skipped by a reader during reading a message. In such cases, the CRC value (or another indicator or metadata) associated with the content of such an email can be appropriately calculated or tagged so as to indicate that those certain portion(s) need not be reviewed in order for the content of that email to have been considered to have been read. Thus, even if those certain portion(s) of the content of an original email are skipped over by a user when reading a subsequent email containing the content of the original email, the system 100 will recognize that it is still appropriate to mark the original email has being read presuming that the user reviewed all of the other content associated with the original email.

In further embodiments, to determine by way of a CRC value whether the content of one email has been modified when reappearing in a corresponding thread portion of another email, the one email is indexed into a database. Indexing can typically be performed by assigning each email a unique key. In some embodiments, the key can be a function of the original sender email address plus the send date/time. In other embodiments, other keys such as the subject line plus the send date/time, internet protocol address plus the send date/time etc. can be employed as keys as well. In alternate embodiments, keys other than those mentioned above can be used for indexing email messages within the database. An exemplary database design for indexing email messages and thread portions within the email messages is shown in Table 1.

TABLE 1

Table: EmailThread
    Key (as mentioned above)
    Original Subject Line
Table: ThreadResponse
    Key (unique -generated)
    EmailThreadKey (from EmailThread table)
    DateTimeResponse (date/time - optional)
    CRC Value (integer - required)
    CompletelyRead (boolean - required)
Table: ThreadResponsePartialReadTracker
    Key (Thread Response)
    StartReadCharOffset
    EndReadCharOffset Turning now to FIGS. 3A-3C, exemplary screenshots of a display 300 associated with an email client such as the first and second clients 102, 104 of FIG. 1 are shown, in accordance with at least some embodiments of the present invention. FIGS. 3A-3C are intended to further illustrate how a listing of email messages within an inbox associated with the email client (such as the listing 200 of FIG. 2A) varies as the system 100 recognizes and updates the read status of different emails. More particularly as shown, in each of the screenshots of FIGS. 3A-3C, the display 300 shows a listing of a plurality of emails 302 that are stored within an inbox (e.g., the inbox 112 within the email server 106 of FIG. 1).

The listing 302 includes the same emails in each screenshot, namely, a first email 304, a second email 306, a third email 308 and a fourth email 310. The emails 304, 306, 308 and 310 can be considered the same emails (or at least emails analogous to the emails) as the emails 204, 206, 208 and 210 of FIG. 2A, respectively, in terms of their relative relationships. That is, each of the second and fourth emails 306, 310 is in reply to the first email 304 and the third email 308 is in reply to the second email. Thus, in this example, the content of the third email 308 incorporates the content (e.g., thread portions) of the first and the second emails 304 and 306, respectively. By comparison with FIG. 2A, the screenshots of FIGS. 3A-3C illustrate that, typically in a listing of emails such as the listing 302, various information regarding each email will be included in the listing (particularly in the respective subject line for that email in the listing) such as, for example, the identity of the sender (or target) of the email, a subject line of the email, a time at which the email was received (or sent), and a size of the email.

As shown specifically in FIG. 3A, to open the third email 308 in the listing 302 for reading, that email can be selected (e.g., by pointing to that email in the listing using a mouse to direct a cursor/pointer and then single clicking), at which point the information corresponding to that email in the listing will be highlighted. After selection of the third email 308, the email can further be opened for reading (e.g., by double clicking, or by right clicking on a mouse and selecting an "open" option from a drop-down menu). Upon opening the third email 308, the message contents of that email can be displayed (e.g., in a manner similar to that described with respect to FIGS. 2B-2E) and read. As mentioned above, the message content of the third email 308 in this example includes the content of each of the first and the second emails 304 and 306, respectively. Once the user has opened (and, at least in some embodiments, read) the email 308, the listing 302 is modified so as to indicate that the email 308 has been read. In the exemplary screen shot of FIG. 3B, the read status of the third email 308 is indicated by virtue of the listing 302 now showing the subject line corresponding to third email as being italicized, and also by modifying an envelope icon 311 on that subject line from being closed to being opened.

Additionally, assuming that during reading of the third email 308 the user has particularly read the portions of that email corresponding to the emails 304 and 306, once the system 100 has recognized that this has occurred, the listing 302 of the emails is further modified to indicate the read status of the emails 304, 306. In particular as shown in FIG. 3C, the read status of the first and second emails 304, 306 is indicated by virtue of the listing 302 now showing the subject lines corresponding to those emails as being italicized, and also showing respective envelope icons on those subject lines as being opened rather than closed. Although in FIGS. 3B-3C italicization and the envelope icons are used to signify emails that have been read, in other embodiments, other indications can be provided including, for example, unbolding the text in the listing associated with a given email when the email is read, if that text is usually bolded when the email is still unread, or the use of other icons or symbols.

Figure 4:
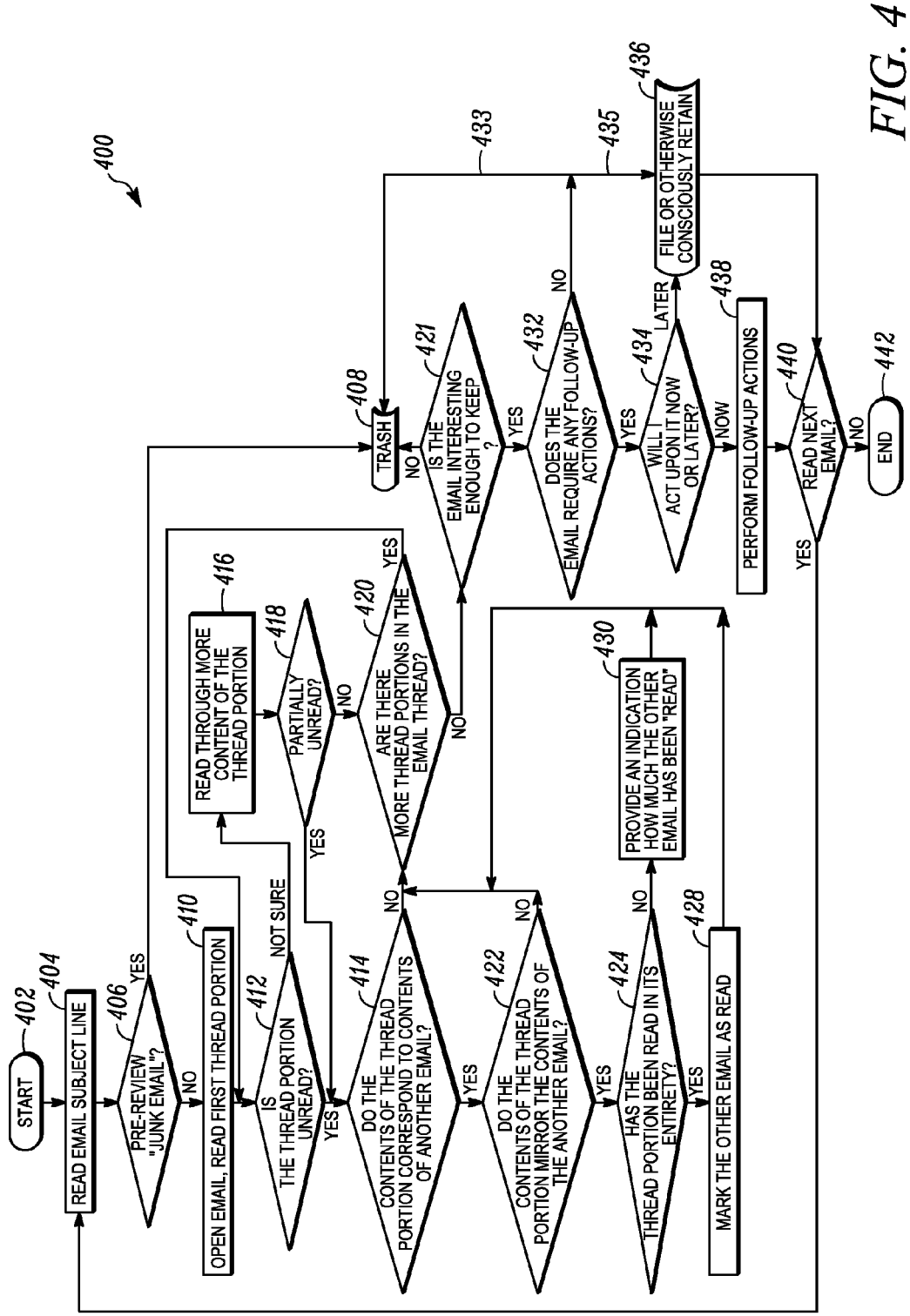
FIG. 4 is a flowchart showing exemplary steps of an exemplary workflow of an incoming email message, in accordance with at least one embodiment of the present invention.

Turning now to FIG. 4, a flowchart 400 is provided showing exemplary steps of an exemplary workflow of an incoming email message (that is, an exemplary manner in which a user and the system 100 process/respond to such an incoming email message), in accordance with at least some embodiments of the present invention. As shown, the workflow starts at a step 402 with the receipt of a new email within the inbox (e.g., the inbox 112) of the email server (e.g., the email server 106), at which point the process proceeds to a step 404. Although not necessarily the case, in the present example it is assumed that the new email received at the step 402 is part of an email thread, such that the contents of the new email include the contents of one or more other (e.g., previously-sent) emails in addition to the newly-added content associated with the new email.

At the step 404, the user reads information representative of the new email (e.g., the "subject line") received at the step 402, as displayed in a listing of the emails of the inbox being accessed by the user via an associated client. Upon reading the subject line, the user determines whether the email thread is a "junk" (e.g., "spam") email thread at a step 406. In some circumstances, the step 406 can be performed automatically by the email client as well (e.g., if the sender is not listed within the "address book" of the receiver), or at least a suggestion can be provided by the email client to the user that the email is junk. If the reader determines that the email is junk or confirms the accuracy of the suggestion provided by the email client (or the email client otherwise automatically determines by itself that the email is indeed junk), then the email is deleted at a step 408. Deletion can be achieved by sending the email to a trash/recycle bin, moving the email to a junk folder, or otherwise.

If at the step 406 it instead is determined that the email is not junk (or may not be junk), presumably at some point the user eventually opens (again, e.g., by double-clicking on the subject line, etc.) the email for reading, at a step 410. At that point, the user begins reading the email contents, beginning with a first thread portion. At a step 412, a determination is made by the user as to whether the user has already read the first thread portion. If the thread portion is indeed an unread response the user then proceeds to read it, and the process advances to a step 414. Also, if the user is unsure as to whether the thread portion of the step 410 is unread, the thread portion is reviewed in greater detail at a step 416 to determine at a step 418 if that thread portion is at least partially unread. If the thread portion is indeed partially unread, then the process also advances from the step 418 to the step 414. However, if at the step 418 it is determined that the thread portion has been read entirely, the process proceeds to the step 420.

Upon the process reaching the step 414, the system 100 makes a determination regarding whether the contents of that thread portion correspond to the contents of another related email contained within the inbox. As described above, the system 100 can make this determination in response to a manual input from the user indicating that the thread portion has been read, or automatically, etc. Generally, although not necessarily, the contents of the first thread portion within the email will correspond to the message content that was first sent with that email and not to message content found in any other (e.g., previously-sent) emails within the inbox. However, with respect to succeeding thread portions within the email, it is more likely that at least some portions of those contents will correspond to the contents of another related email.

Thus, if at the step 414, the system 100 determines that the contents of the thread portion being reviewed correspond to the contents of another email, then at a step 422 it is determined by the system whether the contents of that thread portion mirror the contents of the another email. Whether the contents of a thread portion mirror the contents of other email(s) is can be determined via any of a variety of techniques as described above (e.g., by comparisons with CRC values) and, if such mirroring is determined to have occurred, then the process advances to a step 424. Alternatively, if at the step 414 the system 100 determines that there is not a correspondence between the thread portion being reviewed and another email, then the process advances to the step 420.

If at the step 422 there is determined to be a correspondence such that the system 100 advances to the step 424, then at the step 424 the system further considers the depth to which the thread portion has been reviewed. As described above, in at least some embodiments, visual cues by way a manual input by the user or an automatic setting can indicate whether the contents of the thread portion have been read entirely, or merely partially. If at the step 424 it is determined that the thread portion has been completely (or otherwise satisfactorily) reviewed, then the system 100 proceeds to a step 428, at which the system modifies, in the inbox, the status of the other email to which the thread portion corresponds so as to indicate that the other email has been read. However, if at the step 424 it is determined that only a partial/incomplete perusal through the thread portion has been made, then the other email to which that thread portion corresponds is not marked as read as indicated by a step 430.

The step 430 is further intended to signify that, in at least some circumstances, a determination can further be made by the system 100 as to the depth of perusal of the thread portion, where the thread portion has been partially but not completely read. If such determinations are made (for example, based upon particular additional inputs provided by a user), the system 100 can further provide indications in the inbox or elsewhere as to the depth of perusal, for example, in the form of progress bars, number, color cues etc. Upon the completion of either the step 428 or the step 430, the process advances to the step 420. The process likewise also advances to the step 420 from the step 422 if, at that step, the contents of the thread portion are determined by the system 100 as not corresponding to the contents of another email within the inbox (e.g., due to additions, deletions and/or modifications).

Upon reaching the step 420, a further determination is made by the system 100 as to whether additional thread portions are present in the email received at the step 402. If any additional thread portion is present, then the process loops back to the step 412 and the steps 414-430 are repeated as described above. The process of reading each thread portion (if not already read) and updating the read status of any corresponding emails in the inbox corresponding to those thread portions is repeated until all of the thread portions have been processed. After processing all of the thread portions, the process next advances to a step 421.

Referring still to FIG. 4, at the step 421, it is ascertained if the email received at the step 402 is of any interest to the user. If the email is of no interest to the user, the email can be deleted at the step 408. If however the email is indeed of interest, certain follow-up actions/post-processing actions are performed on the email as shown at steps 432-438. With respect to the step 432 in particular, it is determined (e.g., by the user) if any follow-up actions are required to be performed in response to the email. Follow up actions on the email message can include actions such as responding back to the sender of the email, responding back to other entities, as well as completing other tasks. If no follow-up action is to be performed at the step 432, the email can either be deleted at the step 408 (as shown via a branch 433) or alternatively filed, printed or otherwise retained (as shown via a branch 435) at a step 436.

In contrast, if a follow-up action is indeed required to be performed at the step 432, the timeline for performing the follow-up action is next determined at a step 434. If at the step 434 the user determines that a follow-up action should be taken not now but at a later date, then the process also advances to the step 436. Alternatively, if it is determined at the step 434 that an immediate action is required, then the process advances to a step 438, at which the immediate follow-up action is performed. Upon the completion of either the step 438 or the step 436 (as well as subsequent to the deleting of an email at the step 408, although this is not shown in FIG. 4), the user can determine if another email is to be read, at a step 440. If another email is to be read, the process loops back to the step 404. Otherwise the process ends at a step 442.

It will also be noted that although not shown, at the step 438, following the completion of the follow-up action, the email thread can be deleted at the step 408 or otherwise filed and/or retained at the step 436. Otherwise, if the follow-up action is to be performed at a later time, the process proceeds to the step 436 where the email thread is filed/retained for follow-up at a later date/time and a determination is made whether any additional emails are to be read at the step 440. If additional emails are indeed to be read, the process loops back to the step 404. Otherwise, the process ends at the step 442.

Notwithstanding the embodiments described above with respect to FIGS. 1-4, various refinements to the features above, as well as various additional features are considered and encompassed within the scope of the invention. For example, although the various email messages have been described with respect to a specific email client, a variety of email clients can be employed. Further, the properties and characteristics of the email clients can vary from one embodiment to another. Several conventional features associated with emails and emails clients, such as, attaching documents, organizing emails within folders, saving emails, etc., although not shown, are contemplated and considered within the scope of the present invention.

By virtue of updating the read status of emails within an inbox associated with an email client as described above, heavy volumes of emails can be effectively managed by a user. Duplicate reading of emails, which were read in their entirety by virtue of reading another email is also avoided or reduced, thereby providing significant time advantages to a user reading emails. Further, differences between various copies of an email or a copy of an email and an actual email can be effectively determined.

It is specifically intended that the present invention not be limited to the embodiments and illustrations contained herein, but include modified forms of those embodiments including portions of the embodiments and combinations of elements of different embodiments as come within the scope of the following claims.

We claim:
1. A method, comprising:
at a client device with a display:
displaying, on the display, an inbox of a user in an email application, the inbox containing a list of email messages received for the user, including a first received email message and a second received email message, wherein:

the first received email message and the second received email message are part of a same email message thread;
the first received email message and the second received email message are displayed as separate, distinct listings in the list of email messages received for the user;
a first read status indicator is concurrently displayed with the first received email message in the list of email messages received for the user; and
a second read status indicator is concurrently displayed with the second received email message in the list of email messages received for the user;
while the first received email message in the list of email messages received for the user is unopened:
opening the second received email message in the list of email messages received for the user;
in response to opening the second received email message in the list of email messages received for the user, displaying content in the second received email message on the display, wherein the content in the second received email message includes content in the first received email message and additional content that is not contained in the content in the first received email message; and
after opening the second received email message, in accordance with a determination that content in the second received email message being reviewed by the user includes the content in the first received email message in the same email message thread, changing the read status of the first received email message in the same email message thread from not read to read.

2. The method of claim 1, including: in response to opening the second received email message in the list of email messages received for the user, changing the read status of the second received email message from not read to read.

3. The method of claim 1, including: after opening the second received email message, in accordance with a determination that content in the second received email message being reviewed by the user includes the content in the first received email message in the same email message thread, changing the first read status indicator from not read to read.

4. A client device, comprising:
a display;
one or more processors;
memory; and
one or more programs, wherein the one or more programs are stored in the memory and configured to be executed by the one or more processors, the one or more programs including instructions for:
displaying, on the display, an inbox of a user in an email application, the inbox containing a list of email messages received for the user, including a first received email message and a second received email message, wherein:
the first received email message and the second received email message are part of a same email message thread;
the first received email message and the second received email message are displayed as separate, distinct listings in the list of email messages received for the user;
a first read status indicator is concurrently displayed with the first received email message in the list of email messages received for the user; and a second read status indicator is concurrently displayed with the second received email message in the list of email messages received for the user;
while the first received email message in the list of email messages received for the user is unopened:
opening the second received email message in the list of email messages received for the user;
in response to opening the second received email message in the list of email messages received for the user, displaying content in the second received email message on the display, wherein the content in the second received email message includes content in the first received email message and additional content that is not contained in the content in the first received email message; and
after opening the second received email message, in accordance with a determination that content in the second received email message being reviewed by the user includes the content in the first received email message in the same email message thread, changing the read status of the first received email message in the same email message thread from not read to read.

5. The device of claim 4, including instructions for: in response to opening the second received email message in the list of email messages received for the user, changing the read status of the second received email message from not read to read.

6. The device of claim 4, including instructions for: after opening the second received email message, in accordance with a determination that content in the second received email message being reviewed by the user includes the content in the first received email message in the same email message thread, changing the first read status indicator from not read to read.

7. A non-transitory computer readable storage medium storing one or more programs, the one or more programs comprising instructions, which when executed by a client device with a display, cause the device to:
display, on the display, an inbox of a user in an email application, the inbox containing a list of email messages received for the user, including a first received email message and a second received email message, wherein:
the first received email message and the second received email message are part of a same email message thread;
the first received email message and the second received email message are displayed as separate, distinct listings in the list of email messages received for the user;
a first read status indicator is concurrently displayed with the first received email message in the list of email messages received for the user; and
a second read status indicator is concurrently displayed with the second received email message in the list of email messages received for the user;
while the first received email message in the list of email messages received for the user is unopened:
open the second received email message in the list of email messages received for the user;
in response to opening the second received email message in the list of email messages received for the user, display content in the second received email message on the display, wherein the content in the second received email message includes content in the first received email message and additional content that is not contained in the content in the first received email message; and after opening the second received email message, in accordance with a determination that content in the second received email message being reviewed by the user includes the content in the first received email message in the same email message thread, change the read status of the first received email message in the same email message thread from not read to read.

8. The computer readable storage medium of claim 7, including instructions, which when executed by the client device, cause the device to: in response to opening the second received email message in the list of email messages received for the user, change the read status of the second received email message from not read to read.

9. The computer readable storage medium of claim 7, including instructions, which when executed by the client device, cause the device to: after opening the second received email message, in accordance with a determination that content in the second received email message being reviewed by the user includes the content in the first received email message in the same email message thread, change the first read status indicator from not read to read.

* * * * *